United States Patent [19]
Hayes

[11] Patent Number: 6,004,108
[45] Date of Patent: Dec. 21, 1999

[54] AIR COMPRESSOR SYSTEM WITHIN A VEHICLE

[76] Inventor: Johnny Hayes, 1223 Firestone Dr., Albany, Ga. 31707

[21] Appl. No.: 08/917,415

[22] Filed: Aug. 25, 1997

[51] Int. Cl.$^6$ ........................................... F04B 17/06
[52] U.S. Cl. ........................................... 417/231; 417/360
[58] Field of Search ........................... 417/231, 229, 417/360, 411; 280/727, 834; 137/351; 239/172; 296/97.22

[56] References Cited

U.S. PATENT DOCUMENTS

| | | | |
|---|---|---|---|
| 3,599,869 | 8/1971 | Oberdorfer | 239/172 |
| 4,017,099 | 4/1977 | Hegel et al. | 280/707 |
| 4,555,083 | 11/1985 | Carter | 248/313 |
| 5,125,800 | 6/1992 | Wong | 417/26 |
| 5,385,178 | 1/1995 | Bedi | 141/59 |

OTHER PUBLICATIONS

Piatt, J., Http://www.jimpiatt.com/jeep.html, p. 1, Feb., 1999.

Sun Performance Products, Http://www.sunperformance.com/quickair/quickair.html, p. 2, Mar., 1999.

Madar, Http://www.redhummer.com/myhummer/air–pump/index.html, pp. 1–2, Jan., 1999.

Yokomura, Http://www.off–road.com/~cyberyj/projects/air/air.html.

Sun Performance Products, Http://www.sunperformance.com/accessories/accessories.html, Mar. 1999.

*Primary Examiner*—Timothy S. Thorpe
*Assistant Examiner*—David J. Torrente

[57] ABSTRACT

An air compressor system within a vehicle including an electric air compressor adapted for removable securement within an engine compartment of a motor vehicle. The air compressor has wiring coupleable with a battery of the motor vehicle. An air hose is provided having a first end secured in communication with the air compressor. The air hose is extendable through an underside of the motor vehicle with a second end thereof extendable outwardly of the motor vehicle. The second end has a universal coupling disposed thereon. A pneumatic tool is provided having an inlet valve adapted for coupling with the universal coupling of the air hose.

1 Claim, 3 Drawing Sheets

AIR COMPRESSOR SYSTEM WITHIN A VEHICLE

BACKGROUND OF THE INVENTION

1. Field of the Invention

The present invention relates to an air compressor system within a vehicle and more particularly pertains to satisfying pressurized air needs for motorists with an air compressor system within a vehicle.

2. Description of the Prior Art

The use of tire inflators is known in the prior art. More specifically, tire inflators heretofore devised and utilized for the purpose of inflating tires are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,981,162 to Grenie et al.; U.S. Pat. No. 5,042,547 to Van De Sype; U.S. Pat. No. Des. 295,754 to Wang; U.S. Pat. No. 5,104,295 to Wong; U.S. Pat. No. 4,776,766 to Brent; and U.S. Pat. No. 4,187,058 to Fish.

While these devices fulfill their respective, particular objective and requirements, the aforementioned patents do not describe an air compressor system within a vehicle for satisfying pressurized air needs for motorists.

In this respect, the air compressor system within a vehicle according to the present invention substantially departs from the conventional concepts and designs of the prior art, and in doing so provides an apparatus primarily developed for the purpose of satisfying pressurized air needs for motorists.

Therefore, it can be appreciated that there exists a continuing need for new and improved air compressor system within a vehicle which can be used for satisfying pressurized air needs for motorists. In this regard, the present invention substantially fulfills this need.

SUMMARY OF THE INVENTION

In the view of the foregoing disadvantages inherent in the known types of tire inflators now present in the prior art, the present invention provides an improved air compressor system within a vehicle. As such, the general purpose of the present invention, which will be described subsequently in greater detail, is to provide a new and improved air compressor system within a vehicle and method which has all the advantages of the prior art and none of the disadvantages.

To attain this, the present invention essentially comprises an electric air compressor adapted for removable securement within an engine compartment of a motor vehicle. The air compressor has a securement bracket defined by a recess through a side wall thereof. A mounting bracket is securable to a side wall of the engine compartment for slidable mating with the recess of the securement bracket. The air compressor has wiring coupleable with a battery of the motor vehicle. A power switch is securable within an interior of the motor vehicle. The power switch has wiring extending therefrom for coupling with the air compressor. An air hose is provided having a first end secured in communication with the air compressor. The air hose is extendable through an underside of the motor vehicle with a second end thereof extendable outwardly of a gas tank outlet chamber of the motor vehicle. The second end has a universal coupling disposed thereon. A pneumatic tool is provided having an inlet valve adapted for coupling with the universal coupling of the air hose.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved air compressor system within a vehicle which has all the advantages of the prior art tire inflators and none of the disadvantages.

It is another object of the present invention to provide a new and improved air compressor system within a vehicle which may be easily and efficiently manufactured and marketed.

It is a further object of the present invention to provide a new and improved air compressor system within a vehicle which is of durable and reliable construction.

An even further object of the present invention is to provide a new and improved air compressor system within a vehicle which is susceptible of a low cost of manufacture with regard to both materials and labor, and which accordingly is then susceptible of low prices of sale to the consuming public, thereby making such an air compressor system within a vehicle economically available to the buying public.

Even still another object of the present invention is to provide a new and improved air compressor system within a vehicle for satisfying pressurized air needs for motorists.

Lastly, it is an object of the present invention to provide a new and improved air compressor system within a vehicle including an electric air compressor adapted for removable securement within an engine compartment of a motor vehicle. The air compressor has wiring coupleable with a battery of the motor vehicle. An air hose is provided having a first end secured in communication with the air compressor. The air hose is extendable through an underside of the motor vehicle with a second end thereof extendable outwardly of the motor vehicle. The second end has a universal coupling disposed thereon. A pneumatic tool is provided having an inlet valve adapted for coupling with the universal coupling of the air hose.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
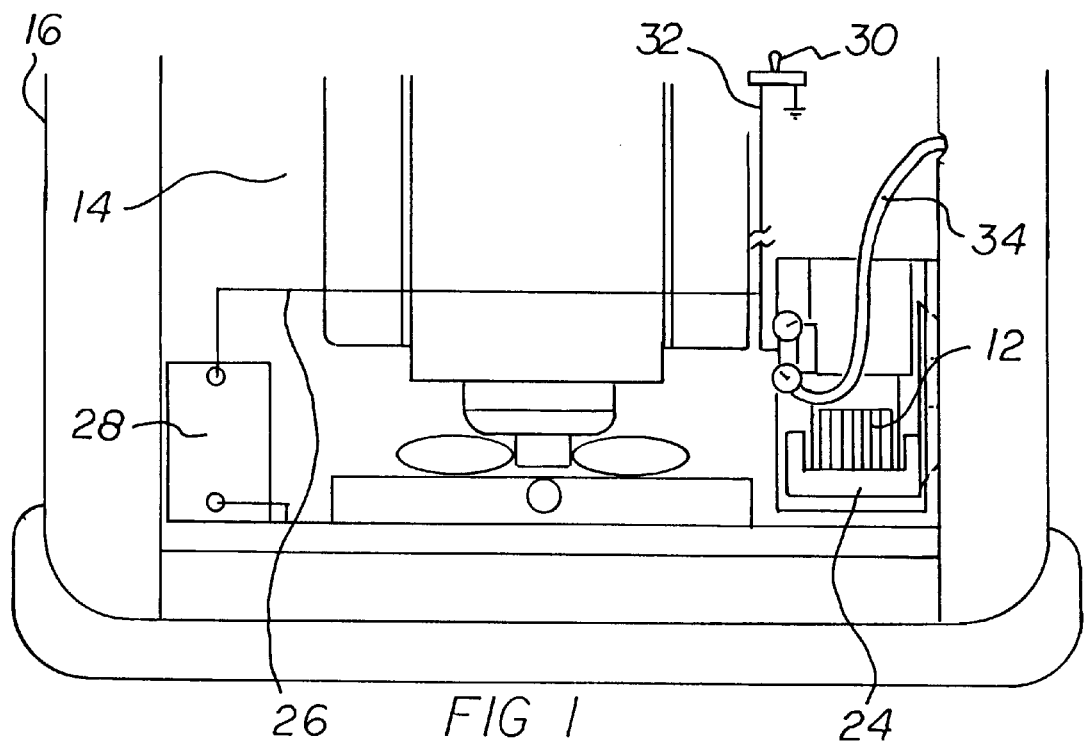
FIG. 1 is a plan view of the preferred embodiment of the air compressor system within a vehicle constructed in accordance with the principles of the present invention.
Figure 2:
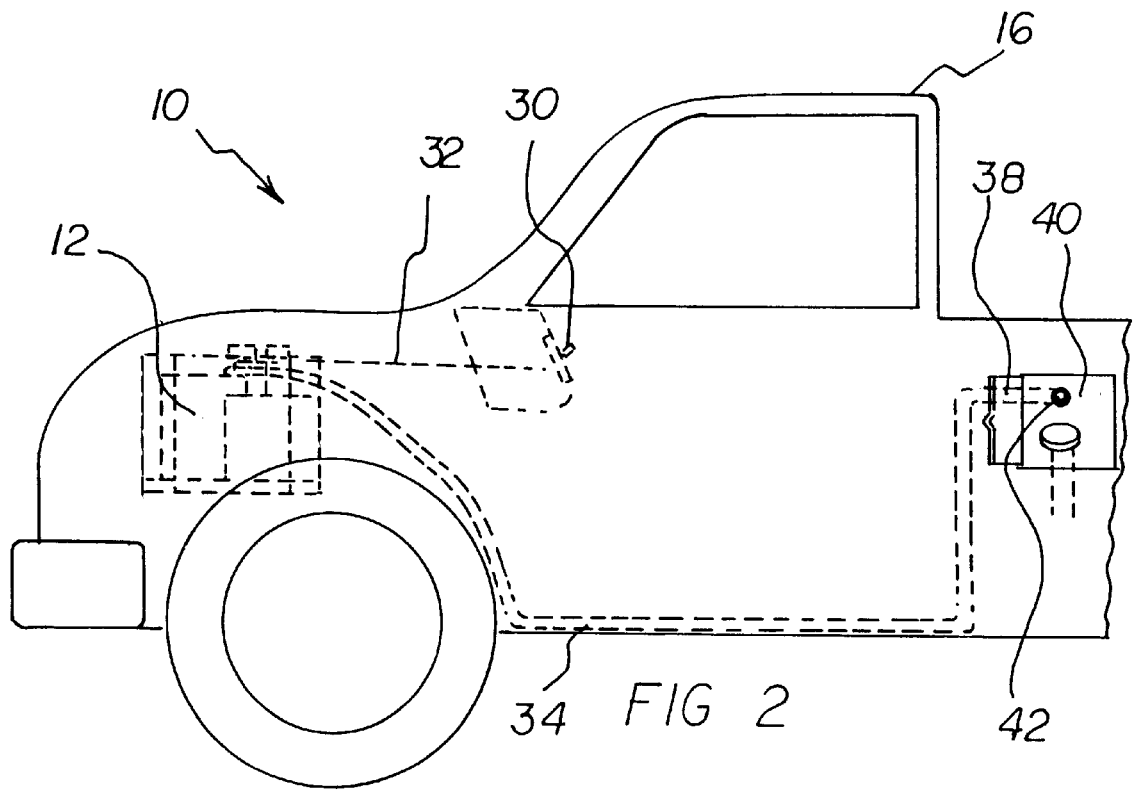
FIG. 2 is a side view of the present invention illustrated in use within a pick-up truck.
Figure 3:
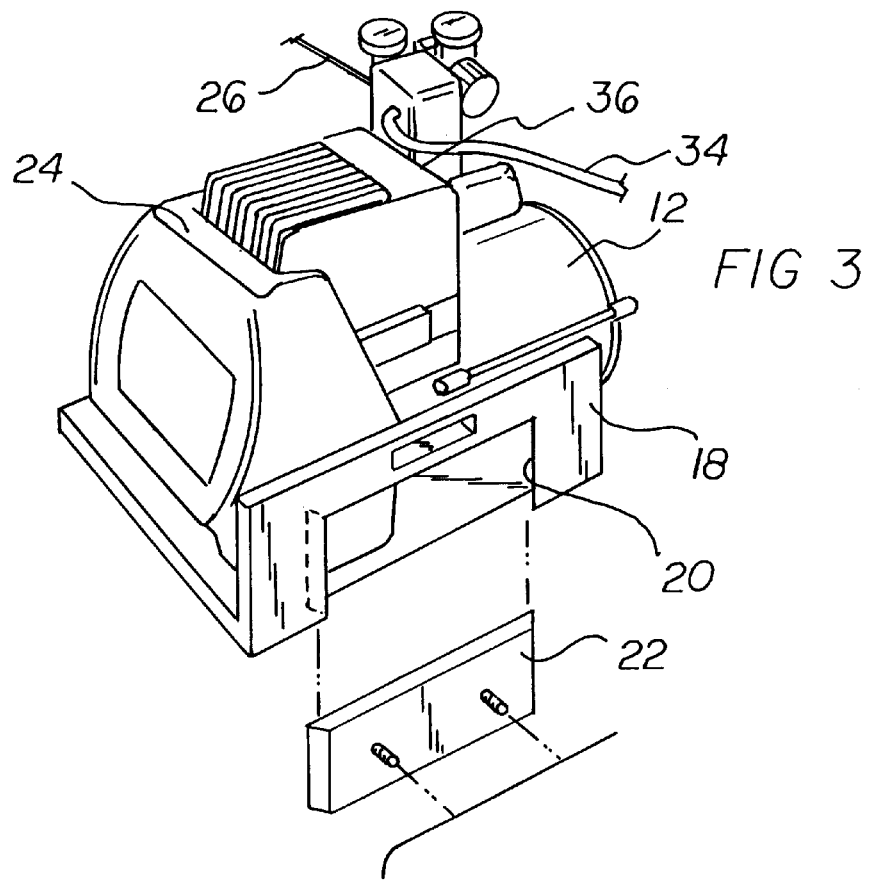
FIG. 3 is perspective view of the electric air compressor of the present invention.

With reference now to the drawings, and in particular, to FIGS. 1 through 5 thereof, the preferred embodiment of the new and improved air compressor system within a vehicle embodying the principles and concepts of the present invention and generally designated by the reference number 10 will be described.

Specifically, it will be noted in the various Figures that the device relates to an air compressor system within a vehicle for satisfying pressurized air needs for motorists. In its broadest context, the device consists of an electric air compressor, a power switch, an air hose and a pneumatic tool. Such components are individually configured and correlated with respect to each other so as to attain the desired objective.

The electric air compressor 12 is adapted for removable securement within an engine compartment 14 of a motor vehicle 16. The air compressor 12 has a securement bracket 18 defined by a recess 20 through a side wall thereof. A mounting bracket 22 is securable to a side wall of the engine compartment 14 for slidable mating with the recess 20 of the securement bracket 18. The use of the securement bracket 18 and the mounting bracket 22 form a dovetail coupling that allows for the air compressor 12 to be removed from within the engine compartment 14 if needed. The air compressor 12 also includes a handle 24 to facilitate its removal from the engine compartment 14. The air compressor 12 has wiring 26 coupleable with a battery 28 of the motor vehicle 16.

The power switch 30 is securable within an interior of the motor vehicle 16. The power switch 30 has wiring 32 extending therefrom for coupling with the air compressor 12. Thus, the air compressor 12 will only be activated when the power switch 30 is disposed in an operative orientation.

The air hose 34 has a first end 36 secured in communication with the air compressor 12. The air hose 34 is extendable through an underside of the motor vehicle 16 with a second end 38 thereof extendable outwardly of a gas tank outlet chamber 40 of the motor vehicle 16. The second end 38 has a universal coupling 42 disposed thereon.

Figure 5:
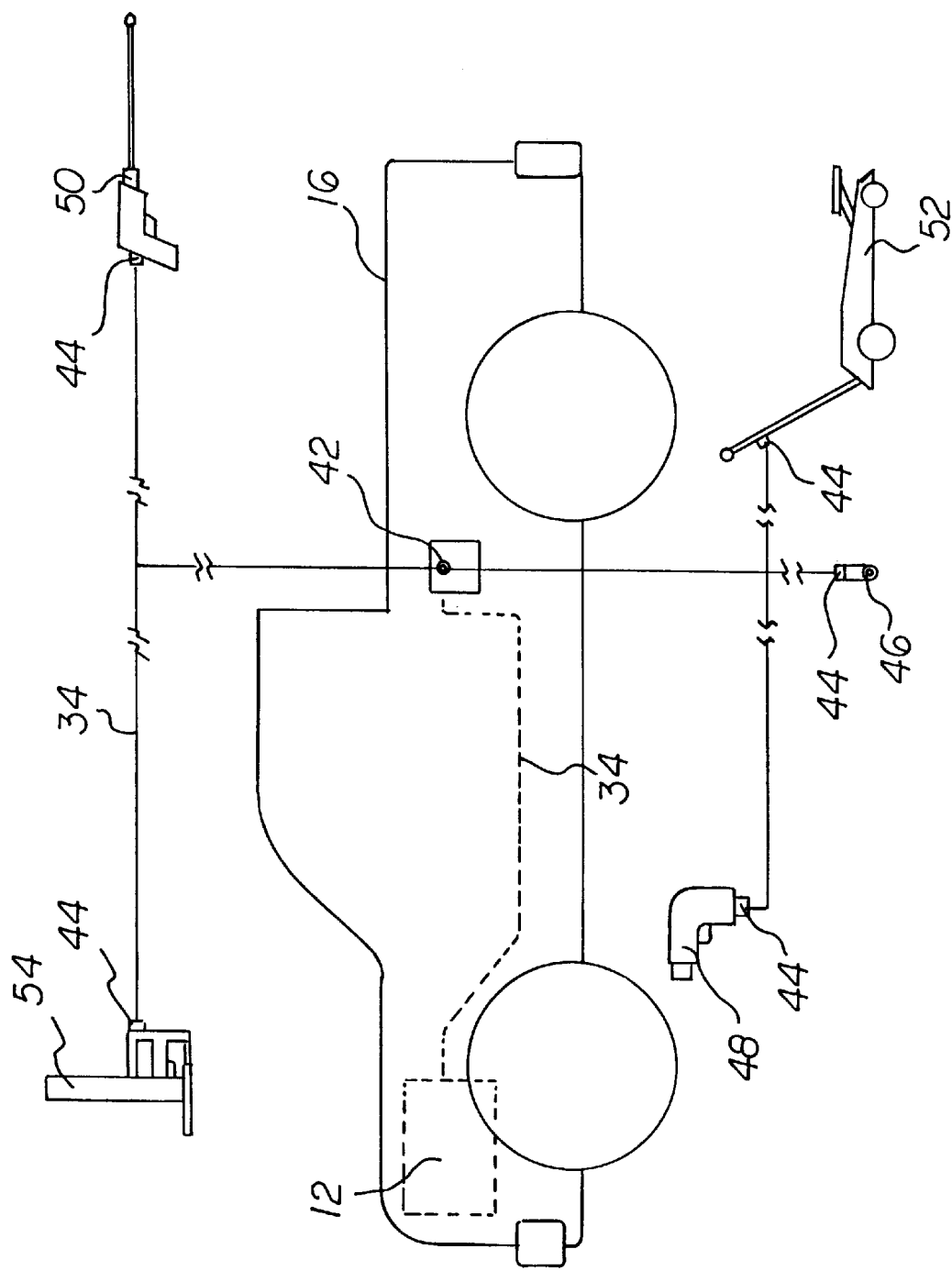
FIG. 5 is side view illustrating multiple applications of the present invention.

The pneumatic tool has an inlet valve 44 adapted for coupling with the universal coupling 42 of the air hose 34. A plurality of pneumatic tools are illustrated in FIG. 5 and include, but are not limited to, an air gun 46, an air drill 48, an air spray 50, an air jack 52 and a nail gun 54.

Figure 4:
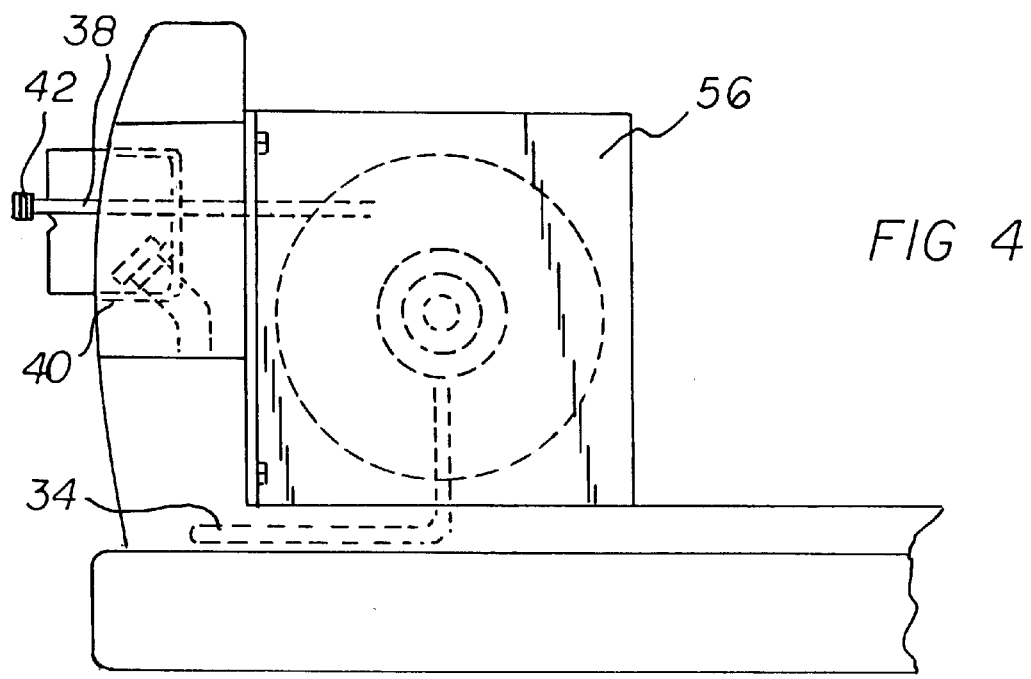
FIG. 4 is front view of an alternate embodiment of the present invention utilizing a retractable air hose.

A second embodiment of the present invention is shown in FIG. 4 and includes substantially all of the components of the present invention further including a housing 56 securable with respect to the motor vehicle 16. The housing 56 retractably receives the air hose 34 therein. This will allow the air hose 34 to be extended to a length suitable to use of the system 10.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed is:

1. An air compressor system within a vehicle for satisfying pressurized air needs for motorists comprising, in combination:

an electric air compressor adapted for removable securement within an engine compartment of a motor vehicle adjacent to the motor, the air compressor having a securement bracket defined by a recess through a side wall thereof, a mounting bracket securable to a side wall of the engine compartment for slidable mating with the recess of the securement bracket, the air compressor having wiring couplable with a battery of the motor vehicle;

a power switch securable within an interior of the motor vehicle, the power switch having wiring extending therefrom for coupling with the air compressor;

an air hose having a first end secured in communication with the air compressor, the air hose extending through an underside of the motor vehicle with a second end thereof extending outwardly of the gas tank outlet chamber of the motor vehicle, the second end having a universal coupling disposed thereon; and a pneumatic tool having an inlet valve adapted for coupling with the universal coupling of the air hose.

* * * * *